US005625508A

United States Patent [19]
Brown et al.

[11] Patent Number: 5,625,508
[45] Date of Patent: Apr. 29, 1997

[54] METHOD AND APPARATUS FOR SERVO DEMODULATION IN A DIRECT ACCESS STORAGE DEVICE

[75] Inventors: Dana H. Brown; Hal H. Ottesen; Gordon J. Smith, all of Rochester, Minn.

[73] Assignee: International Business Machines Corporation, Armonk, N.Y.

[21] Appl. No.: 491,103

[22] Filed: Jun. 16, 1995

Related U.S. Application Data

[63] Continuation of Ser. No. 112,496, Aug. 26, 1993, abandoned.

[51] Int. Cl.$^6$ .................................................. G11B 5/596
[52] U.S. Cl. ............................. 360/77.02; 360/77.08; 332/109
[58] Field of Search .......................... 360/77.02, 77.07, 360/77.08, 44, 77.05, 77.01; 332/109, 110

[56] References Cited

U.S. PATENT DOCUMENTS

| | | | |
|---|---|---|---|
| 3,534,344 | 10/1970 | Santana . | |
| 3,686,649 | 8/1972 | Behr | 360/77.07 |
| 3,691,543 | 9/1972 | Mueller | 360/77.02 |
| 4,074,328 | 2/1978 | Hardwick | 360/77.06 |
| 4,087,842 | 5/1978 | Manly | 360/77.06 |
| 4,204,234 | 5/1980 | Noble | 360/77.06 |
| 4,416,002 | 11/1983 | Oguino et al. | 369/44.27 |
| 4,424,543 | 1/1984 | Lewis et al. | 360/77.08 X |
| 4,546,395 | 10/1985 | Sellars | 360/77.01 |
| 4,642,562 | 2/1987 | Collins et al. | 324/76.82 |
| 4,835,631 | 5/1989 | Miyake et al. | 360/78.04 |
| 4,878,135 | 10/1989 | Makino et al. | 360/78.04 |
| 4,896,228 | 1/1990 | Amakasu et al. | 360/77.08 |
| 4,907,107 | 3/1990 | Sakurai | 360/77.06 |
| 5,025,328 | 6/1991 | Silva | 360/44 X |
| 5,136,439 | 8/1992 | Welspfenning et al. | 360/77.08 |
| 5,140,477 | 8/1992 | Hashimoto | 360/77.05 |

FOREIGN PATENT DOCUMENTS

| | | |
|---|---|---|
| 62-146472 | 6/1987 | Japan . |
| 3168982 | 7/1991 | Japan . |

OTHER PUBLICATIONS

*TTL Data Book*, vol. 2, ©1985, pp. 3–1137–3–1140.
"Abstract of SU1674243, Aug. 30, 1991, Soviet Union".

Primary Examiner—Aristotelis Psitos
Assistant Examiner—James T. Wilson
Attorney, Agent, or Firm—Joan Pennington

[57] ABSTRACT

A method and apparatus are provided for servo demodulation in a direct access storage device. A readback signal is sensed from at least one disk surface and locations of positive and negative peaks in the sensed readback signal are detected for providing a detected peak signal. A square wave signal having a period variable with distance between detected locations of positive and negative peaks is generated using the detected peak signal and applied to a servo demodulator in the direct access storage device.

8 Claims, 5 Drawing Sheets

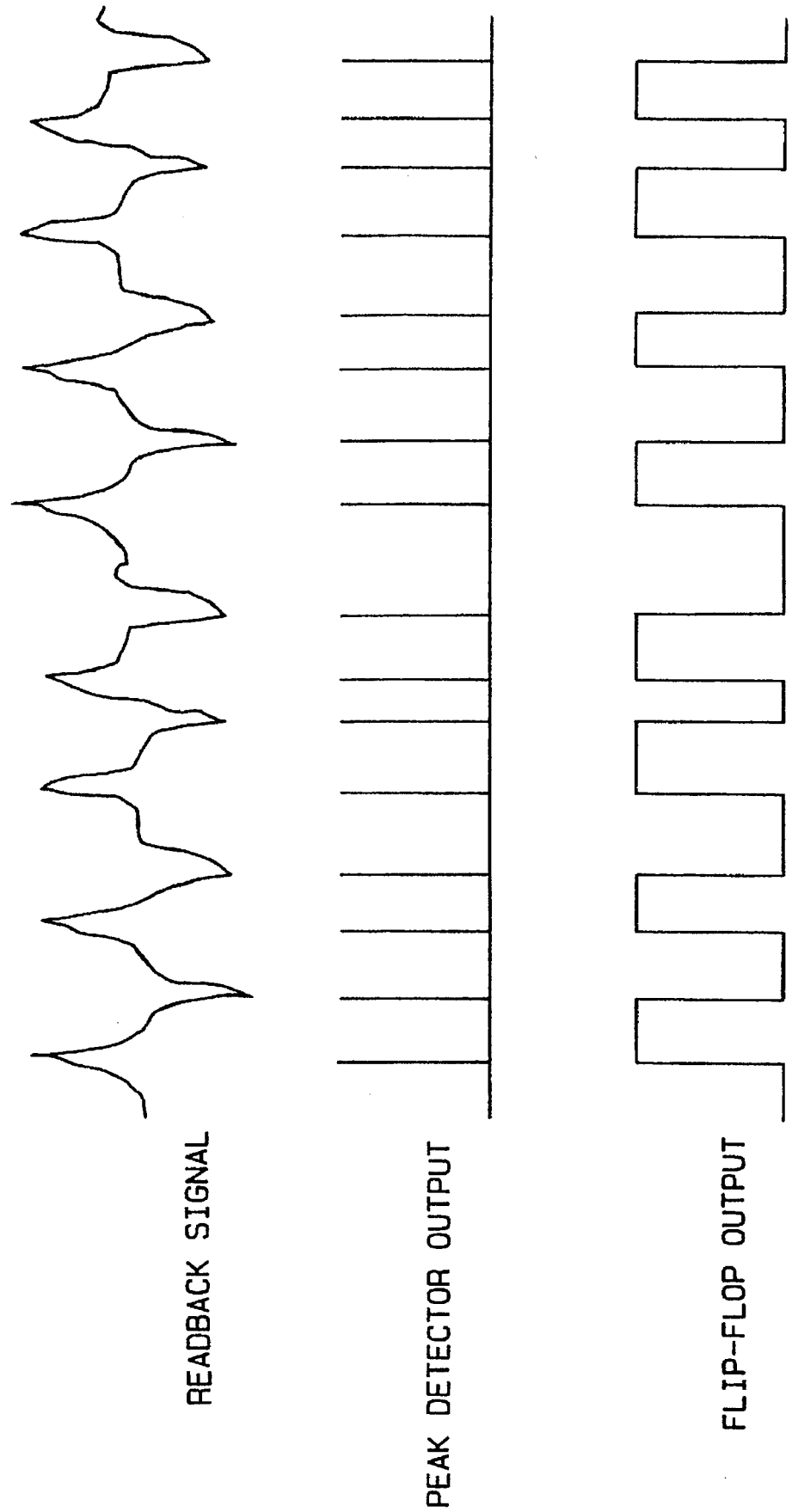

METHOD AND APPARATUS FOR SERVO DEMODULATION IN A DIRECT ACCESS STORAGE DEVICE

This application is a continuation of application Ser. No. 08/112,496 filed Aug. 26, 1993, now abandoned.

BACKGROUND OF THE INVENTION

1. Field of the Invention

The present invention relates generally to a servo positioning system in a direct access storage device (DASD) and more particularly to a servo demodulator method and apparatus for use with transducer heads having instabilities.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

All DASD units must have a method to position each data head over the proper radial location to write a track and again, to position it very close to the same location to read the track. With the higher level files using a voice coil type of actuator, a feedback mechanism must be provided to locate and stably hold the head on a given track. Typically, track accessing and track following are provided utilizing a magnetically written pattern in the DASD unit. A dedicated servo system employs one surface of one of the disks in the DASD on which to have all the tracking and access information. A sector servo system uses small portions of tracks between each or between several sectors on each track of each data surface to provide the tracking and access information. A hybrid servo system uses both to obtain advantages of each type of servo.

Phase demodulators are known for servo control in a DASD. In some known phase demodulators, the phase information stored in the servo patterns is derived by extracting a fundamental harmonic, such as 2.5 Mhz, from the readback signal by a bandpass filter with a third harmonic trap. The first harmonic signal is then amplified and clipped, resulting in a square wave with precise phase transitions based on the zero crossings of the first harmonic signal. This square wave is then exclusive ORed or XORed with a 2.5 Mhz crystal oscillator and the transition differences between these two signals are integrated over a certain period. The integrator value at the end of this period is proportional to the head offset relative to the track center line. This value is referred to as the position error signal (PES). The problem with this arrangement is that the generation of the first harmonic signal is based upon amplitude rather than phase.

A problem exists to generate a position error signal (PES) from a phase modulated (PM) servo pattern in the presence of magnetic recording head instability. When instabilities are present in the readback signal, a PES generated by amplitude modulation (AM) is inferior to phase modulation (PM). Phase modulation (PM) is well known to have better noise immunity at an adequate signal-to-noise (S/N) than amplitude modulation. Instability of a transducer head affects the accuracy of the position error signal (PES) when the reference tracks are being read. Offset errors of up to 100 microinches have been seen between reference track updates. These offset errors usually occur if an unstable MR head is used for writing between reference track updates. Such instabilities are common with current magnetic head designs for DASD including mini-monolithic, thin film inductive, and magneto-resistive (MR) transducer heads. As head geometries continue to be reduced, magnetic instability problems will likely worsen.

SUMMARY OF THE INVENTION

A principal object of the present invention is to provide an improved method and apparatus for servo demodulation in a direct access storage device. Other objects are to provide such method and apparatus for servo demodulation in a disk drive data storage system substantially without negative effects and that overcome many of the disadvantages of prior art arrangements.

In brief, the objects and advantages of the present invention are achieved by a method and apparatus for servo demodulation in a direct access storage device. A readback signal is sensed from at least one disk surface and locations of positive and negative peaks in the sensed readback signal are detected for providing a detected peak signal. A square wave signal having a period variable with distance between detected locations of positive and negative peaks is generated using the detected peak signal and applied to a servo demodulator in the direct access storage device.

BRIEF DESCRIPTION OF THE DRAWINGS

The present invention together with the above and other objects and advantages may best be understood from the following detailed description of the embodiment of the invention illustrated in the drawings, wherein:

FIG. 7 is a timing diagram chart illustrating phase detection operation of the apparatus of FIGS. 3 and 4.

DETAILED DESCRIPTION OF THE PREFERRED EMBODIMENTS

Figure 1:
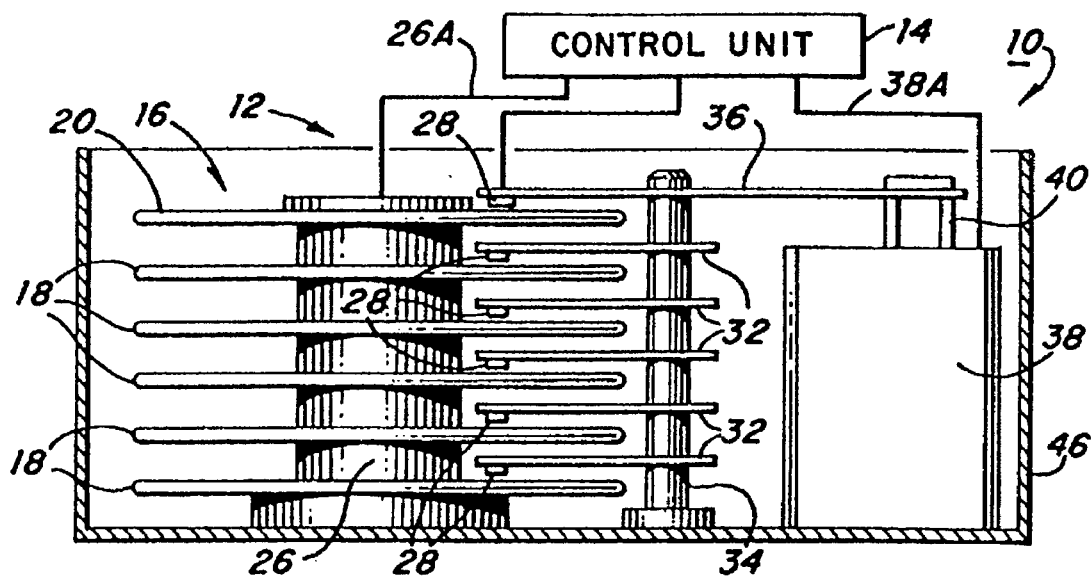
FIG. 1 is a schematic and block diagram of a data storage disk file embodying the present invention.

In FIG. 1 there is shown a partly schematic block diagram of parts of a data storage disk file 10 including a data storage medium generally designated as 12 and a control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Figure 2:
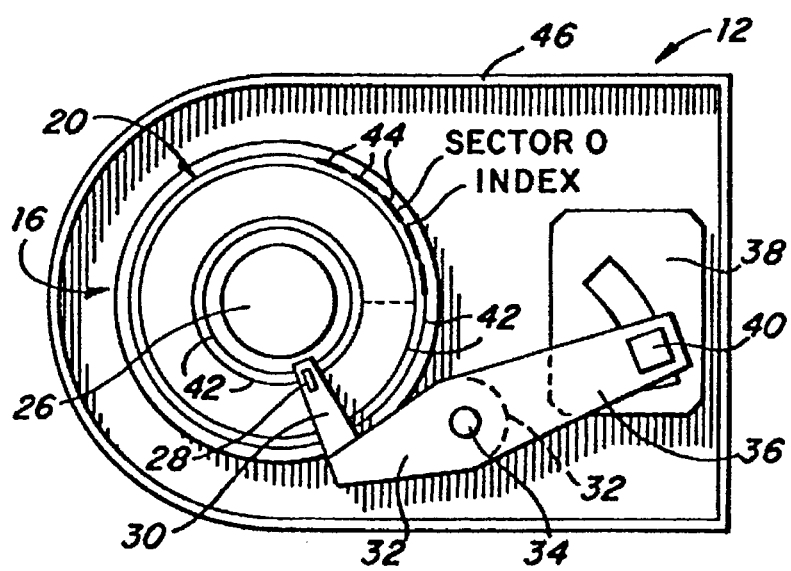
FIG. 2 is a diagram showing the accessing mechanism for a single disk surface of the apparatus of FIG. 1.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data information tracks or data cylinders 42 to be followed and access particular data sectors 44. Data storage disk file 10 is a modular unit including a housing 46. The various components of the disk file 10 are controlled in operation by signals generated by control unit 14 such as motor control signals on line 26A and position control signals on line 38A.

Numerous data information tracks 42 each at a specific radial location are arrayed in a concentric pattern in the magnetic medium of each disk surface 20 of data disks 18. A data cylinder includes a set of corresponding data information tracks 42 for the data surfaces 20 in the data storage disk file 10. Data information tracks 42 include a plurality of segments or data sectors 44, each containing a predefined size of individual groups of data records which are saved for later retrieval and updates. The data information tracks 42 are disposed at predetermined positions relative to a servo reference index. In FIG. 2 one sector 44 is illustrated as SECTOR 0 with a fixed index or mark INDEX for properly locating the first data sector. The location of each next sector 44 is identified by a sector identification (SID) pulse read by transducer heads 28 from surfaces 20.

Figure 3:
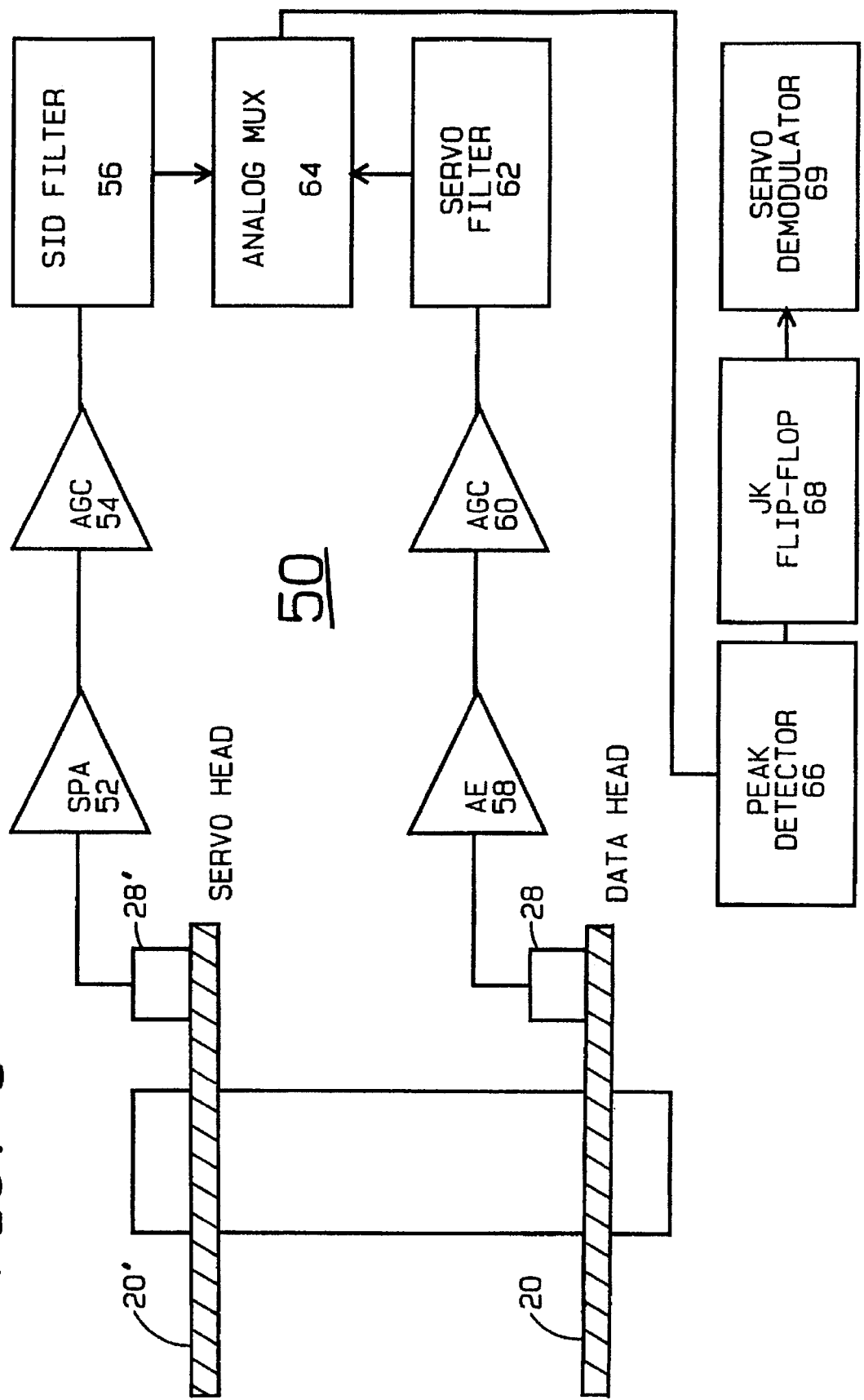
FIGS. 3 and 4 are block diagram representations illustrating apparatus for carrying out the servo demodulation method according to the present invention in the data storage disk file of FIG. 1.

Referring to FIG. 3, there is shown a circuit diagram illustrating servo signal detection apparatus for carrying out the phase generation method of the invention generally designated by the reference numeral 50.

In accordance with a feature of the phase generation method of the invention, servo phase information is obtained from the temporal locations of the positive and negative peaks which are the most stable portions of an unstable waveform. The conventional use of the first harmonic zero crossings is eliminated to avoid providing a flawed PES in the presence of recording head instabilities. The positive and negative peaks, which correspond to the occurrence of magnetic transitions in the disk surface passing under the transducer heads 28 and 28', may vary in amplitude, but their temporal position variations shows very little variation. In accordance with the invention, phase is derived from these peaks rather than the current first-harmonic-zero-crossing method. It should be noted that for best servo performance, the servo pattern peaks should be far enough apart in order to minimize intersymbol interference between peaks or nonlinear bit shift.

Figure 5:
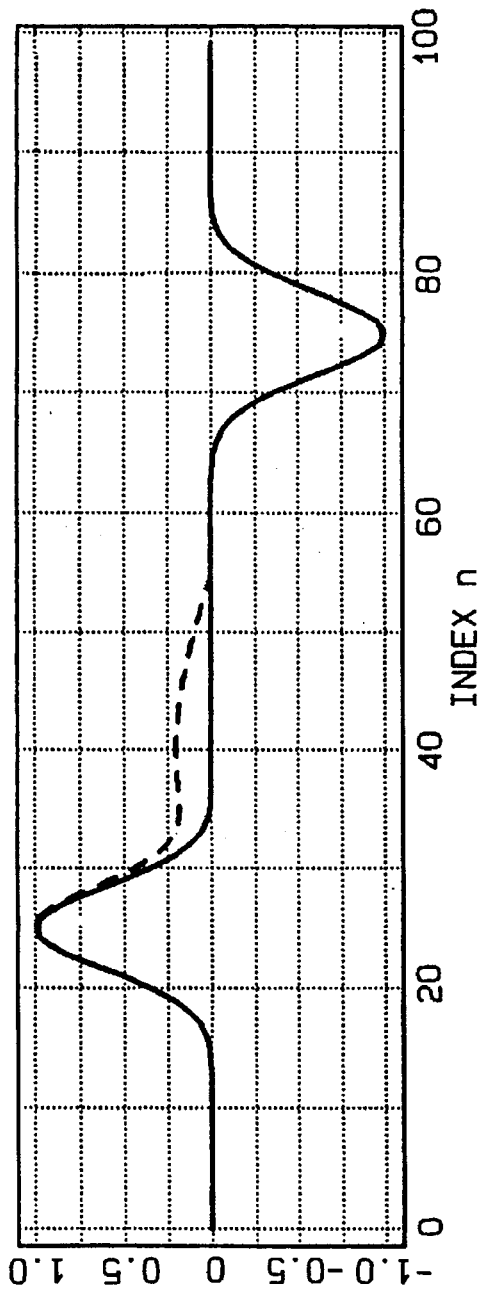
FIG. 5 is a chart illustrating a stable readback signal and a readback signal with instability shown in dotted line.
Figure 6:
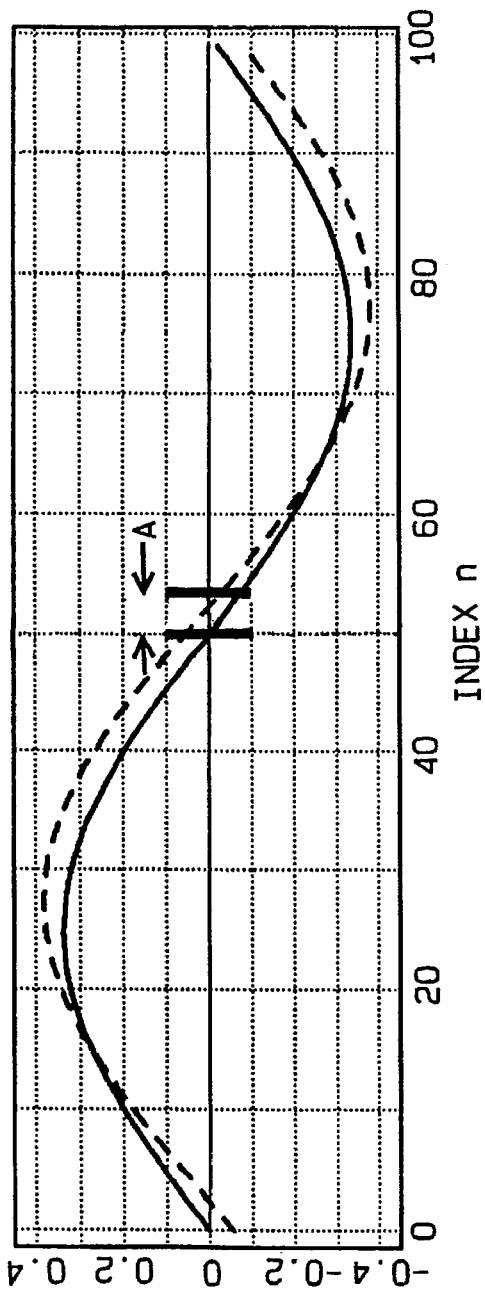
FIG. 6 is a chart illustrating a first harmonic signal component of the readback signals of FIG. 5.

Referring first to FIG. 5, there is shown a stable readback signal together with a readback signal with instability shown in dotted line. FIG. 6 illustrates a respective first harmonic signal component of the readback signals of FIG. 5. An unstable recording head provides a readback signal as illustrated in dotted line that has unpredictable bumps and pits in the waveform. When a harmonic signal is extracted from such a deformed signal, both the phase and amplitude of the harmonic signal will vary as a function of the waveform irregularities. A phase shift difference between the two first harmonic waveforms is indicated by arrows labelled A in FIG. 6. This difference causes an error in the servo PES demodulation process, and thus causes a registration error in the off-track position measurement. This problem is clearly evident from the simulated example depicted in FIGS. 5 and 6.

In FIG. 3 apparatus 50 includes a servo channel including a dedicated servo surface 20' shown together with a dedicated servo transducer head 28' coupled to a SPA 52, an automatic gain control (AGC) 54 and a servo identification (SID) filter 56. A data channel includes a data transducer head 28 disposed adjacent a data surface 20, arm electronics (AE) 58, an automatic gain control (AGC) 60 and a servo filter 62. The high-pass SID filter 56 and servo filter 62 sharpen the peaks of the readback signal and remove any low-frequency content.

While FIG. 3 shows circuitry 50 with a dedicated servo architecture with reference tracks, it should be understood that the invention applies to sector servo architectures as well. Signals from either the dedicated servo thin film head 28' or data transducer head 28, i.e., reference track are multiplexed at an analog multiplexer block 64. A peak detector 66 coupled to the multiplexer 64 detects the temporal locations of positive and negative peaks in the readback signal.

Figure 4:
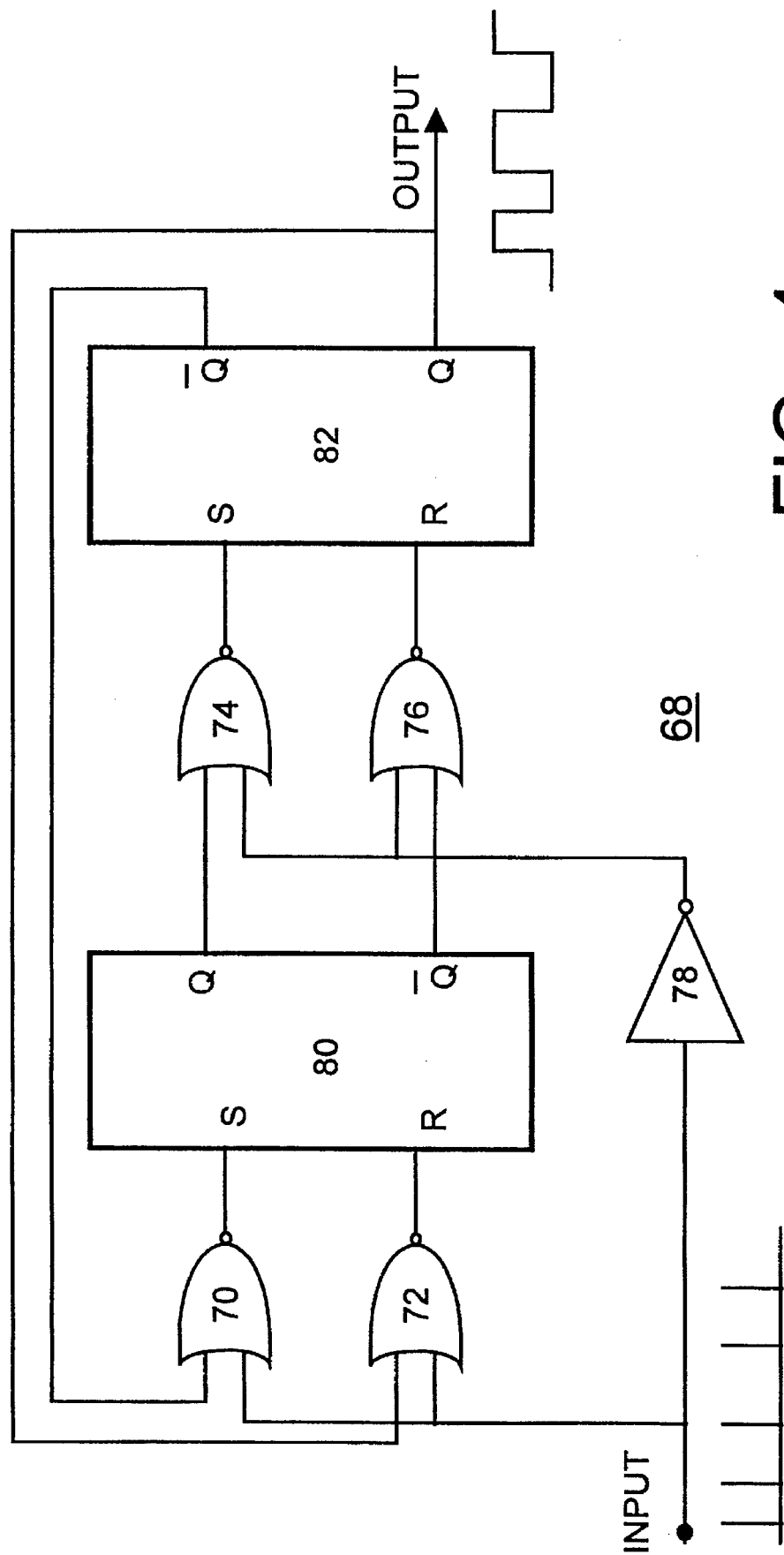

The output of the peak detector 66 is supplied to a JK type flip-flop 68 which is edge-triggered and connected as a divide-by-two function as shown in FIG. 4. This output signal of flip-flop 68 is then applied to a conventional servo demodulator module 69. Flip-flop divided-by-two circuit 68 replaces an analog bandpass filter being used in conventional servo demodulation arrangements. Replacing this analog bandpass filter allows accurate phase information to be reported to the servo module comparator input of demodulator 69 in the presence of instabilities.

FIG. 4 showns the configuration of JK flip-flop 68 to permit divide-by-two operation. JK flip-flop 68 includes a plurality of NOR gates 70, 72, 74 and 76; an inverter 78 and flip-flop blocks 80 and 82. For this operation, the outputs Q and $\bar{Q}$ of block 82 are fed back to the JK inputs, i.e., one of the inputs of the input NOR gates 70, 72. This feedback correspondingly sets and resets the output Q or $\bar{Q}$ at the output latch. The edge-triggering input timing allows more accurate phase detection operation. Fast edges coming from the previous peak detector block 66 in FIG. 3 cause the JK flip-flop output to change accordingly.

In FIG. 7, a timing diagram illustrates a servo readback signal and an output of the peak detector 66 together with the generation of the phase-modulated square wave at the output of the flip-flop 68. The output of the flip-flop 68 is a logic square wave whose period varies with the distance between peaks of the readback signal. It is shown that despite the irregularities in amplitude of the signal caused by head instabilities, the peak position is faithfully reproduced in the square wave flip-flop output. The edges of the peak detector output essentially determine the resulting phase-modulated square wave. Note that the only portions of the readback signal needed for PES generation are the time locations of the positive-going and negative-going peaks.

While the invention has been described with reference to details of the illustrated embodiment, these details are not intended to limit the scope of the invention as defined in the appended claims.

What is claimed and desired to be secured by Letters Patent of the United States is:

1. A method for servo demodulation in a direct access storage device comprising the steps of:

sensing a phase modulated servo readback signal from a phase modulated servo pattern from at least one disk surface; said sensed phase modulated servo readback signal including alternating positive and negative servo pattern peaks;

directly detecting time locations of said positive and negative servo pattern peaks in said sensed phase modulated servo readback signal for providing a detected servo pattern peak position signal;

applying said detected servo pattern peak position signal to a phase modulated servo square wave generating circuit for generating a phase modulated servo square wave signal, said generated phase modulated servo square wave signal being a logic square wave having a period variable with distance between detected peak locations; said phase modulated servo square wave generating circuit comprising a first flip-flop block, a second flip-flop block, each flip-flop block having a set input and a reset input and a true output and an inverted output; a first pair of NOR gates respectively connected to the set input and the reset input of the first flip-flop block; and a second pair of NOR gates respectively connected to the set input and the reset input of the second flip-flop block; said first pair of NOR gates receiving said detected servo pattern peak position signal at a first input and the true output and the inverted output of the second flip-flop block respectively connected at a second input; said second pair of NOR gates receiving an inverted detected servo pattern peak position signal at a first and the true output and the inverted output of the first flip-flop block respectively connected at a second input; and applying said generated phase modulated servo square wave logic signal to a servo demodulator.

2. A method as recited in claim 1 wherein said step of detecting locations of positive and negative servo pattern peaks in said sensed phase modulated servo readback signal for providing a detected servo pattern peak position signal includes the step of:

using a peak detector for detecting locations of said positive and negative servo pattern peaks in said sensed phase modulated servo readback signal corresponding to the occurrence of magnetic transitions in said phase modulated servo pattern from disk surface.

3. Apparatus for servo demodulation in a direct access storage device comprising:

means for sensing a phase modulated servo readback signal from a phase modulated servo pattern from at least one disk surface; said sensed phase modulated servo readback signal including alternating positive and negative servo pattern peaks;

means for directly detecting time locations of said positive and negative servo pattern peaks in said sensed phase modulated servo readback signal for providing a detected servo pattern peak position signal; and means for generating responsive to said detected servo pattern peak position signal a phase modulated servo square wave signal, said phase modulated servo square wave signal being a logic square wave having a period variable with distance between detected peak locations; said phase modulated servo square wave signal generating means comprising a first flip-flop block, a second flip-flop block, each flip-flop block having a set input and a reset input and a true output and an inverted output; a first pair of NOR gates respectively connected to the set input and the reset input of the first flip-flop block; and a second pair of NOR gates respectively connected to the set input and the reset input of the second flip-flop block; said first pair of NOR gates receiving said detected servo pattern peak position signal at a first input and the true output and the inverted output of the second flip-flop block respectively connected at a second input; said second pair of NOR gates receiving an inverted detected servo pattern peak position signal at a first and the true output and the inverted output of the first flip-flop block respectively connected at a second input; and servo demodulator means responsive to said generated phase modulated servo square wave logic signal for providing servo phase information.

4. Apparatus as recited in claim 3 wherein said means for detecting locations of said positive and negative servo pattern peaks in said sensed phase modulated servo readback signal for providing a detected servo pattern peak position signal includes a peak detector in a servo channel of the direct access storage device.

5. Apparatus as recited in claim 3 wherein said first flip-flop block and second flip-flop block of said square wave signal generating means includes an edge triggered flip-flop circuit.

6. Apparatus as recited in claim 5 wherein said edge triggered flip-flop circuit is coupled to said servo demodulator means provided in the servo channel of the direct access storage device.

7. A disk file comprising:

an enclosure;

a plurality of disk surfaces for storing data and for storing servo identification information on at least one disk surface, said disk surfaces mounted in parallel for simultaneous rotation about an axis within said enclosure;

transducer means mounted for movement in a radial direction across said disk surfaces for reading and writing data to said disk surfaces and for identifying servo identification information;

means for sensing a phase modulated servo readback signal from a phase modulated servo pattern from at least one disk surface; said sensed phase modulated servo readback signal including alternating positive and negative servo pattern peaks;

means for directly detecting time locations of positive and negative servo pattern peaks in said sensed phase modulated servo readback signal for providing a detected servo pattern peak position signal; and means for generating responsive to said detected servo pattern peak position signal a phase modulated servo square wave signal, said phase modulated servo square wave signal being a logic square wave having a period variable with distance between detected peak locations; said phase modulated servo square wave signal generating means comprising a first flip-flop block, a second flip-flop block, each flip-flop block having a set input and a reset input and a true output and an inverted output; a first pair of NOR gates respectively connected to the set input and the reset input of the first flip-flop block; and a second pair of NOR gates respectively connected to the set input and the reset input of the second flip-flop block; said first pair of NOR gates receiving said detected servo pattern peak position signal at a first input and the true output and the inverted output of the second flip-flop block respectively connected at a second input; said second pair of NOR gates receiving an inverted detected servo pattern peak position signal at a first and the true output and the inverted output of the first flip-flop block respectively connected at a second input; and servo demodulator means responsive to said generated phase modulated servo square wave logic signal for providing servo phase information.

8. A disk file as recited in claim 7 wherein said phase modulated servo square wave signal generating means is coupled to said servo demodulator means provided in the servo channel of the disk file.

* * * * *